(12) United States Patent
Iwama

(10) Patent No.: US 7,773,312 B2  
(45) Date of Patent: Aug. 10, 2010

(54) ZOOM LENS AND IMAGE PICKUP APPARATUS HAVING THE SAME

(75) Inventor: Rei Iwama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/421,376

(22) Filed: Apr. 9, 2009

(65) Prior Publication Data

US 2009/0257130 A1    Oct. 15, 2009

(30) Foreign Application Priority Data

Apr. 9, 2008  (JP) .............................. 2008-101395

(51) Int. Cl.
*G02B 15/14* (2006.01)
(52) U.S. Cl. ...................... 359/689; 359/695
(58) Field of Classification Search ................ 359/689, 359/695, 676, 682, 684
See application file for complete search history.

(56) References Cited

U.S. PATENT DOCUMENTS

| | | | |
|---|---|---|---|
| 7,110,187 B2 | 9/2006 | Shirota | |
| 7,215,483 B2 | 5/2007 | Sekita | |
| 7,333,275 B2 | 2/2008 | Sekita | |
| 2008/0180810 A1* | 7/2008 | Ito | 359/689 |

FOREIGN PATENT DOCUMENTS

| | | |
|---|---|---|
| JP | H07-261083 A | 10/1995 |
| JP | 2004-061675 A | 2/2004 |
| JP | 2006-208890 A | 8/2006 |
| JP | 2007-212636 A | 8/2007 |

* cited by examiner

*Primary Examiner*—Alicia M Harrington  
(74) *Attorney, Agent, or Firm*—Canon USA Inc IP Division

(57) ABSTRACT

A zoom lens includes, in order from an object side to an image side, a first lens group of negative refracting power, a second lens group of positive refracting power and a third lens group of positive refracting power, wherein the first and second lens groups are configured to move during a zooming operation, and wherein a focal length of the whole system at a wide-angle end, a focal length of the whole system at a telephoto end, focal lengths of the first, second, and third lens groups, the lateral magnification of the second lens group at the wide-angle end, and the lateral magnification of the second lens group at the telephoto end are appropriately set to assure a zoom lens which is small in the lens whole system size and which provides good optical performance throughout the whole zoom range.

16 Claims, 9 Drawing Sheets

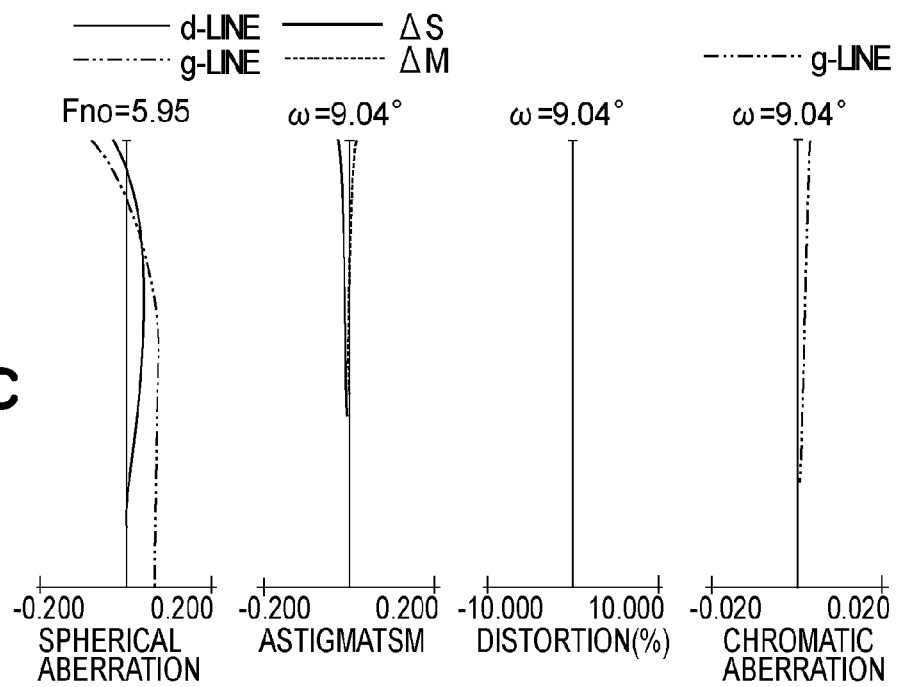
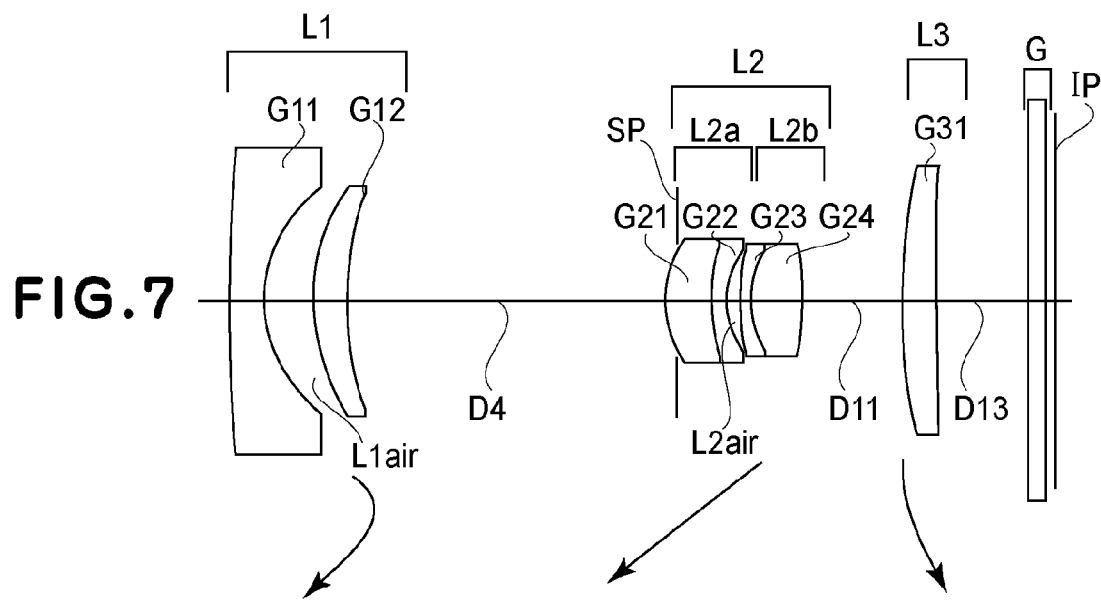

ZOOM LENS AND IMAGE PICKUP APPARATUS HAVING THE SAME

BACKGROUND OF THE INVENTION

1. Field of the Invention

This invention relates to a zoom lens suitably usable in an image pickup apparatus such as a digital still camera, video camera or TV camera, for example.

2. Description of the Related Art

Recently, the functionality of an image pickup apparatus (camera) such as a video camera or a digital still camera using a solid-state image sensing device has been raised. With the trend of such high functions of image pickup apparatuses, a small-sized zoom lens having high optical performance with a large aperture ratio covering a wide field angle (photographic field angle) has been desired.

In the cameras using a solid-state image sensing device, various optical members such as a low pass filter and a color correction filter are disposed between the lens trailing end and the image pickup device. For this reason, a zoom lens having a relatively long back focus is desired.

Furthermore, with regard to a color camera using an image pickup device for color images, the zoom lens should have good telecentric characteristic at the image side to avoid color shading.

As a zoom lens which is small in the whole system size and which has a long back focus and still which has good telecentric characteristic at the image side, a negative-lead type zoom lens having a lens group of negative refracting power disposed closest to the object side is known.

An example of such negative-lead type zoom lens is a three-group zoom lens which is comprised of, in an order from the object side to the image side, a first lens group of negative refracting power, a second lens group of positive refracting power and a third lens group of positive refracting power (Japanese Laid-Open Patent Application No. 07-261083).

A zoom lens which is one of the three-group zoom lenses and which has attempted the field-angle widening is known (U.S. Pat. No. 7,215,483 and Japanese Laid-Open Patent Application No. 2007-212636).

Furthermore, a zoom lens which is one of the three-group zoom lenses and which has attempted the zoom-ratio enhancement is known (Japanese Laid-Open Patent Application No. 2006-208890 and U.S. Pat. No. 7,110,187).

Furthermore, a three-group zoom lens of this type in which all lens groups are moved during the zooming and chromatic aberration is well corrected using a cemented lens in the second lens group is known (Japanese Laid-Open Patent Application No. 2004-61675 and U.S. Pat. No. 7,333,275).

In order to reduce the size of the whole system and to enhance the zoom ratio in such three-group zoom lens of negative-lead type, it is effective to strengthen the refracting power of each lens group constituting the zoom lens.

However, if for example the refracting power of each lens group is just strengthened in an attempt to widen the field angle and enhance the zoom ratio, variation of aberration due to the zooming operation will increase, causing a difficulty in obtaining good optical performance in the whole zoom range.

In consideration of this, in order to accomplish reduction in size of the whole system and to achieve the field-angle widening and zoom-ratio enhancement as well in the three-group zoom lens of negative-lead type, it is very important to appropriately set the refracting power distribution of the lens groups and the movement locus of the lens groups during the zooming operation.

If, for example, the value of the refracting power of the first lens group is not set appropriately, it becomes very difficult to obtain good optical performance while assuring reduction in size of the whole system and widening of the field angle at the same time.

Furthermore, in order to obtain good optical performance in the whole zoom range while assuring the zoom-ratio enhancement, it is important that the variation of aberration should be suppressed during the zooming operation.

Particularly, in order to obtain good optical performance in the whole zoom range while assuring reduction in size of the whole lens system and zoom-ratio enhancement, it is important to set the lens structure of the second lens group which is the major power-varying lens group.

If, for example, the refracting power of the second lens group and the imaging magnification at the wide-angle end and telephoto end are not set appropriately, it becomes difficult to reduce variation of aberrations resulting from the zooming.

These are not limited to three-group zoom lenses of negative-lead type, but they are similarly applicable also to zoom lenses of negative-lead type having four or more lens groups.

SUMMARY OF THE INVENTION

In accordance with an aspect of the present invention, there is provided a zoom lens, comprising: a first lens group of negative refracting power; a second lens group of positive refracting power; and a third lens group of positive refracting power, wherein the first lens group, the second lens group and the third lens group are disposed in the following order from an object side of the zoom lens to an image side of the zoom lens: the first lens group, the second lens group and the third lens group, wherein the first lens group and the second lens group are configured to move during a zooming operation, and wherein, when a focal length of a system comprising the first lens group, the second lens group and the third lens group at a wide-angle end is denoted by fw, a focal length of the system at a telephoto end is denoted by fT, a focal length of the first lens group is denoted by f1, a focal length of the second lens group is denoted by f2, a focal length of the third lens group is denoted by f3, a lateral magnification of the second lens group at the wide-angle end is denoted by β2w, and a lateral magnification of the second lens group at the telephoto end is denoted by β2T, the following conditions:

$$0.00 < |f1/f3| < 0.45$$

$$1.0 < |\beta 2w|/(1/\sqrt{(\beta 2T/\beta 2w)}) < 1.5$$

$$0.00 < f2/\sqrt{(fw \times fT)} \leq 0.5$$

are satisfied.

In one form of this aspect of the present invention, a conditional expression $$3.5 < \beta 2T/\beta 2w < 7.0$$

is satisfied.

The first lens group may include at least one positive lens, wherein, when a refractive index of a material of the positive lens is denoted by nd, a conditional expression $$nd > 1.93$$

may be satisfied.

An air lens may be defined in the second lens group, wherein, when a curvature radius of an object side surface of the air lens is denoted by R1air and a curvature radius of an image side surface of the air lens is denoted by R2air, a conditional expression $$-10 < (R1air + R2air)/(R1air - R2air) < -1$$

may be satisfied.

The first lens group may comprise two lenses, wherein, when a curvature radius of an image side surface of a lens of the first lens group which lens is disposed at the object side is denoted by G1R2 and a curvature radius of an object side surface of a lens of the first lens group which lens is disposed at the image side is denoted by G2R1, a conditional expression $$-10.0 < (G1R2 + G2R1)/(G1R2 - G2R1) < -3.3$$

may be satisfied.

When a focal length of the third lens group is denoted by f3, a conditional expression $$5.1 < f3/fw < 11.0$$

may be satisfied.

The first lens group may comprise two lenses, wherein, when a focal length of a lens of the first lens group which lens is disposed at the image side is denoted by f_G2 and a focal length of the first lens group is denoted by f1, a conditional expression $$1.5 < f\_G2/f1 < 2.5$$

may be satisfied.

When, among lenses comprising the second lens group, a refractive index of a material of a lens disposed closest to the object side is denoted by N2, a conditional expression $$N2 > 1.75$$

may be satisfied.

During the zooming operation from the wide-angle end to the telephoto end, the first lens group may move while partly drawing a locus being convexed toward the image side, the second lens group may move monotonously toward the object side, and the third lens group may move toward the image side.

The first lens group may include a negative lens having an object side surface and an image side surface which are of aspherical shape.

The third lens group may move to the object side to perform focusing from an infinity object to a short-distance object.

The first lens group may include, in an order from the object side to the image side, a negative lens of meniscus shape having a convex surface at the object side, and a positive lens of meniscus shape having a convex surface at the object side.

The second lens group may include, in an order from the object side to the image side, a cemented lens comprising a positive lens having a convex surface at the object side and a negative lens having a concave surface at the image side, and another cemented lens comprising a negative lens having a convex surface at the object side and a positive lens having a convex surface at the object side.

The second lens group may include, in an order from the object side to the image side, a cemented lens comprising a positive lens having a convex surface at the object side and a negative lens having a concave surface at the image side, and a positive lens.

The third lens group may comprise a single positive lens.

In accordance with another aspect of the present invention, there is provided an image pickup apparatus, comprising: a zoom lens as recited above; and a solid-state image sensing device configured to receive an image formed by the zoom lens.

In summary, the present invention provides a zoom lens in which the whole lens system is compact and good optical performance is obtainable in the whole zoom range.

These and other features and aspects of the present invention will become more apparent upon a consideration of the following description of embodiments of the present invention taken in conjunction with the accompanying drawings.

BRIEF DESCRIPTION OF THE DRAWINGS

FIG. 6A, FIG. 6B and FIG. 6C are aberration diagrams of the zoom lens of the third embodiment.

FIG. 7 is a sectional view of a zoom lens at the wide-angle end, according to a fourth embodiment of the present invention.

DESCRIPTION OF THE EMBODIMENTS

Embodiments of the present invention will now be described with reference to the attached drawings.

A zoom lens according to the present invention may comprise, in an order from the object side to the image side, a first lens group of negative refracting power, a second lens group of positive refracting power and a third lens group of positive refracting power.

During the zooming operation, at least the first lens group and the second lens group are moved.

In the zoom lens according to the present invention, a lens group having a refracting power may be disposed at the object side of the first lens group or at the image side of the third lens group.

Figure 1:
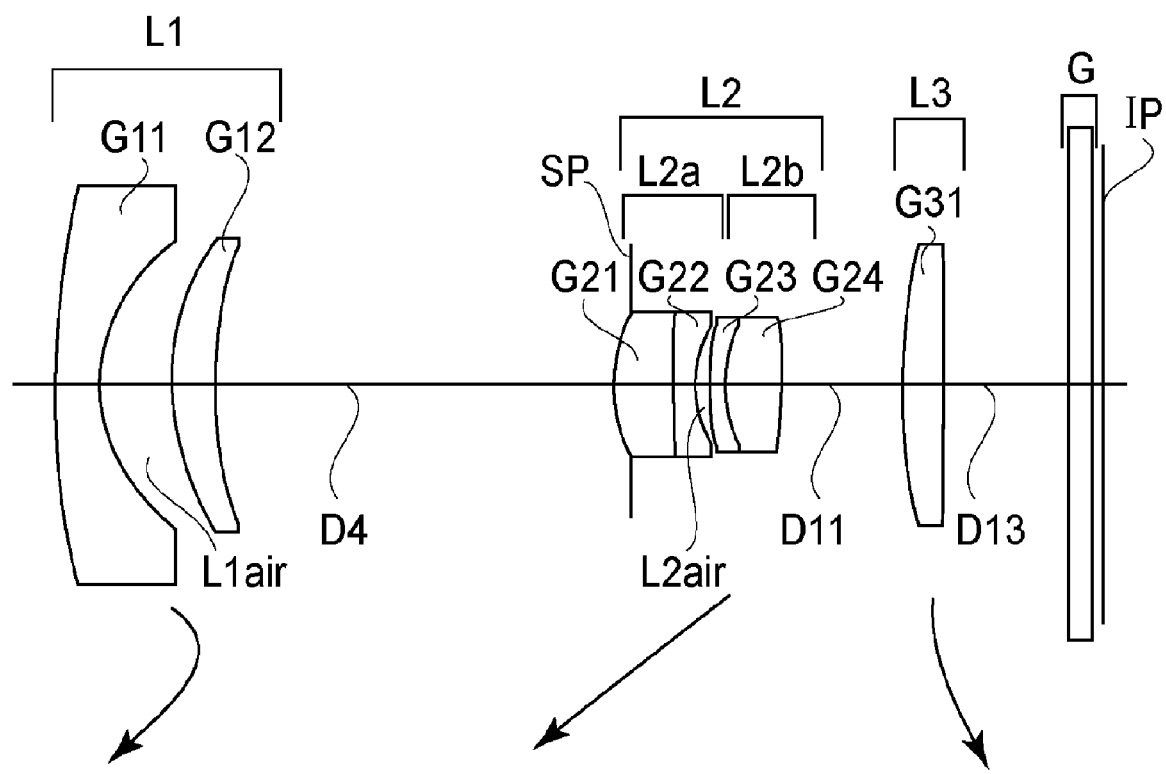
FIG. 1 is a sectional view of a zoom lens at the wide-angle end, according to a first embodiment of the present invention.
Figure 2A:
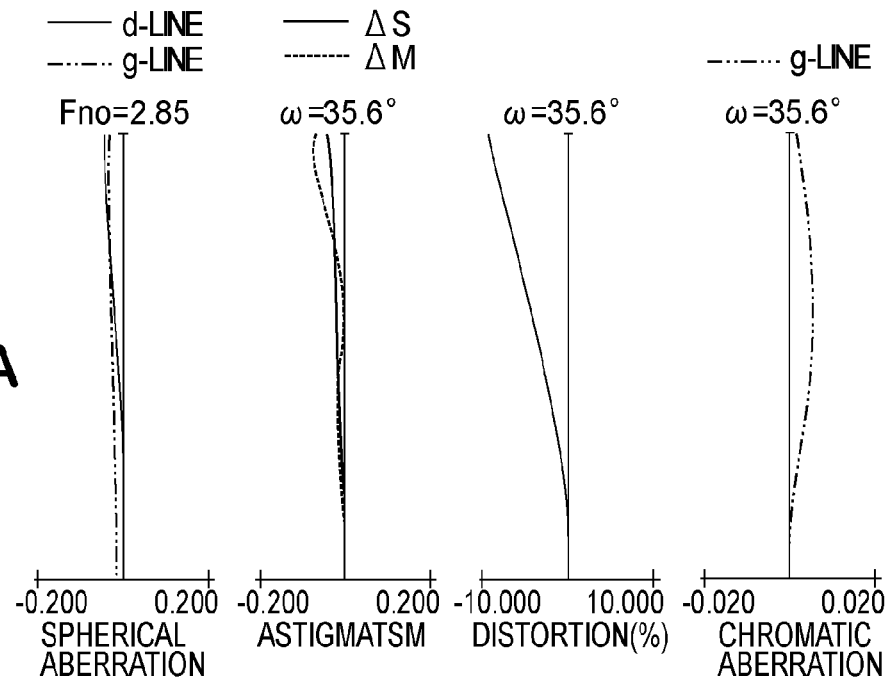
FIG. 2A, FIG. 2B and FIG. 2C are aberration diagrams of the zoom lens of the first embodiment.
Figure 2B:
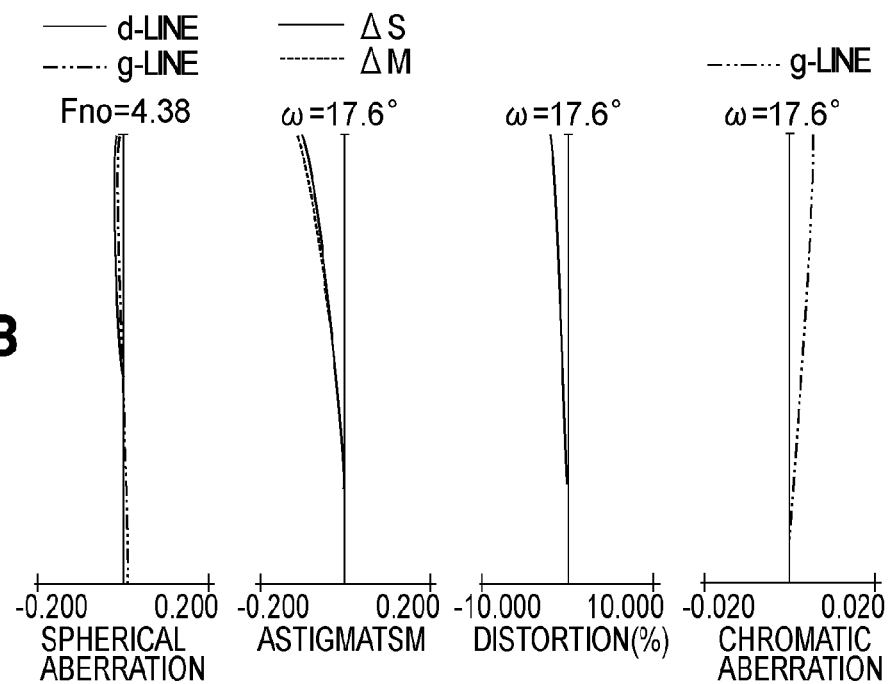
Figure 2C:
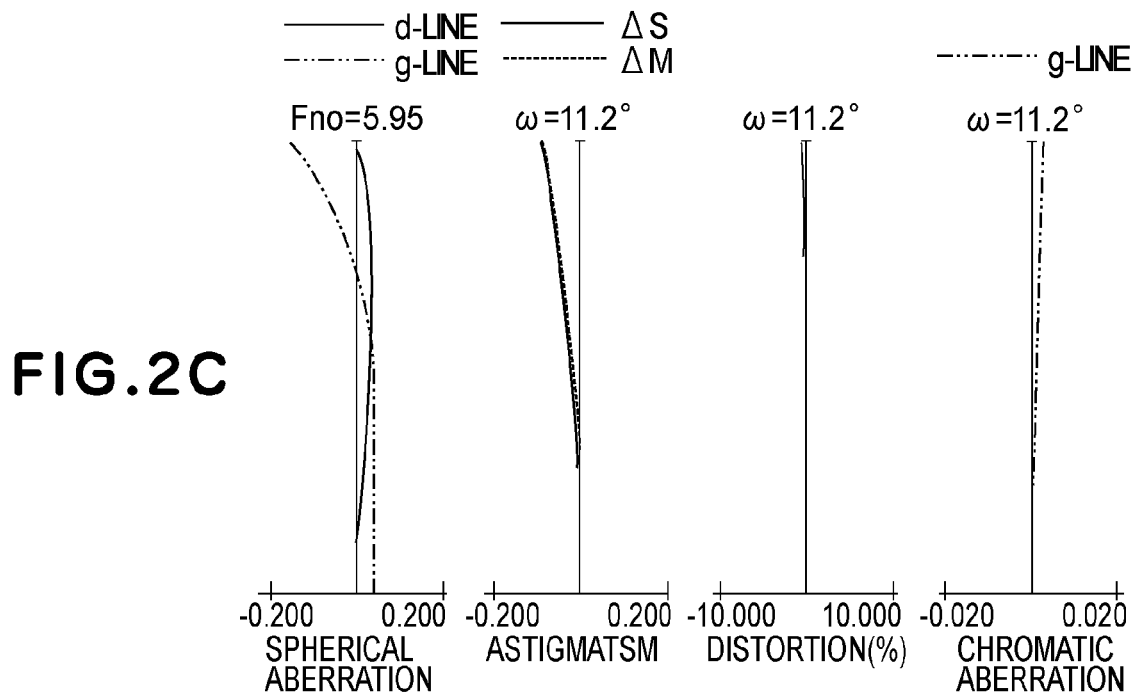

FIG. 1 is a lens sectional view at the wide-angle end (short focal-length end) according to a first embodiment of the present invention. FIG. 2A, FIG. 2B and FIG. 2C are aberration diagrams in the first embodiment of the present invention, at the wide-angle end, an intermediate zoom position and the telephoto end (long focal-length end), respectively. The first embodiment provides a zoom lens having a zoom ratio of 3.79 and an aperture ratio of around 2.9 to 5.9.

Figure 3:
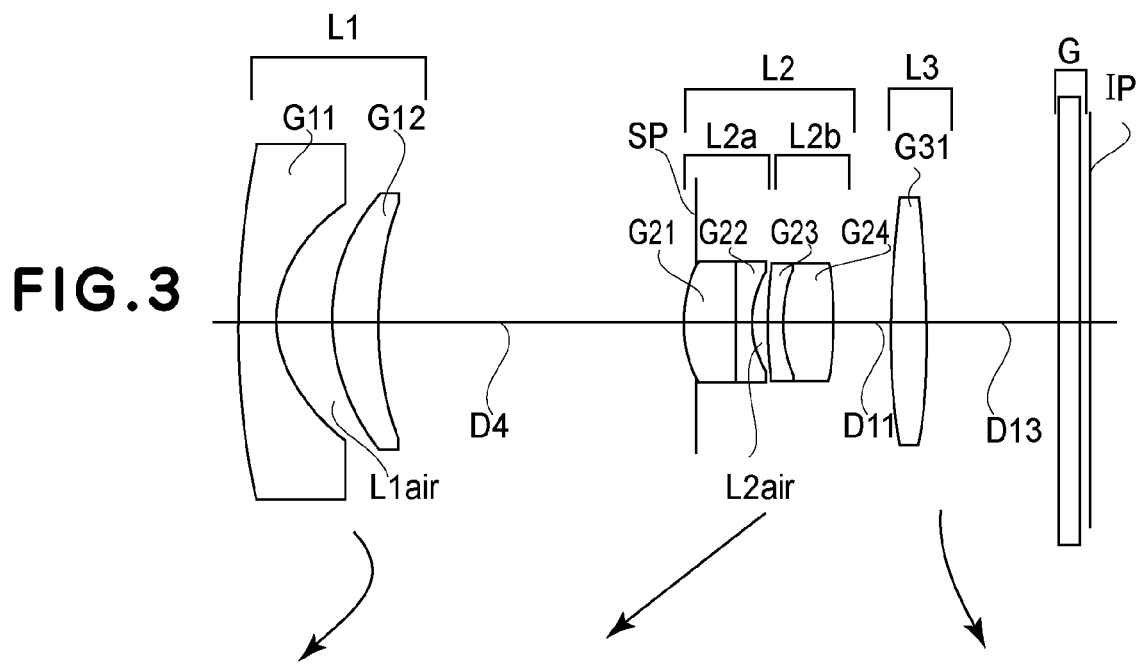
FIG. 3 is a sectional view of a zoom lens at the wide-angle end, according to a second embodiment of the present invention.
Figure 4A:
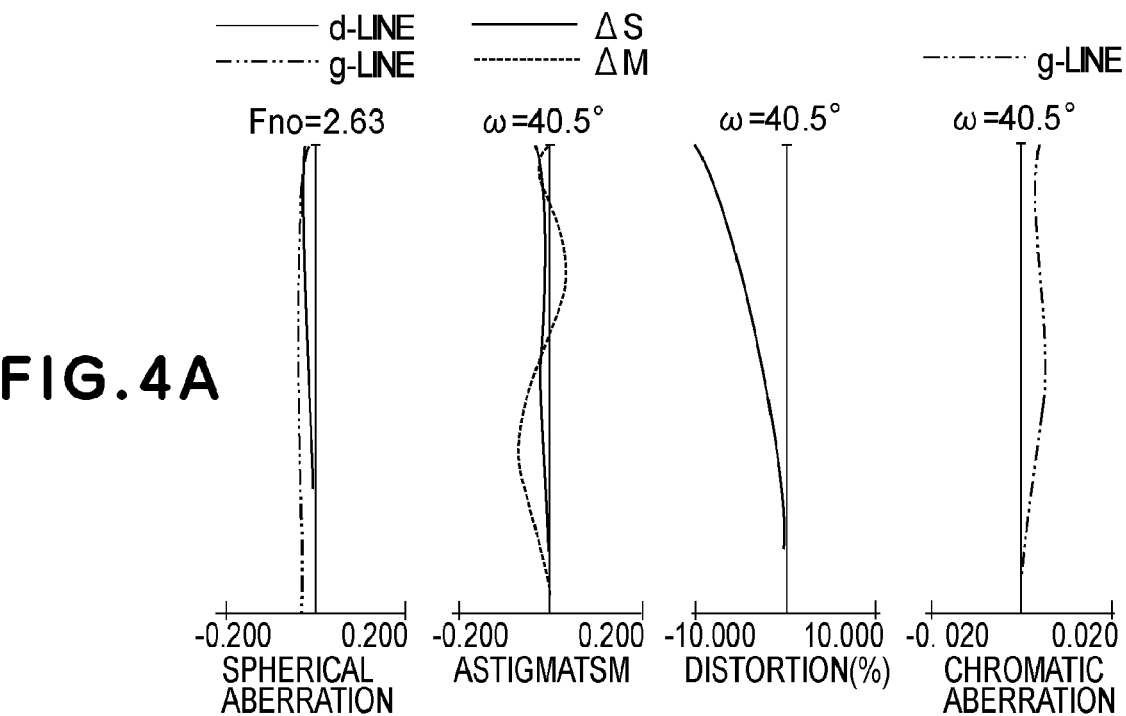
FIG. 4A, FIG. 4B and FIG. 4C are aberration diagrams of the zoom lens of the second embodiment.
Figure 4B:
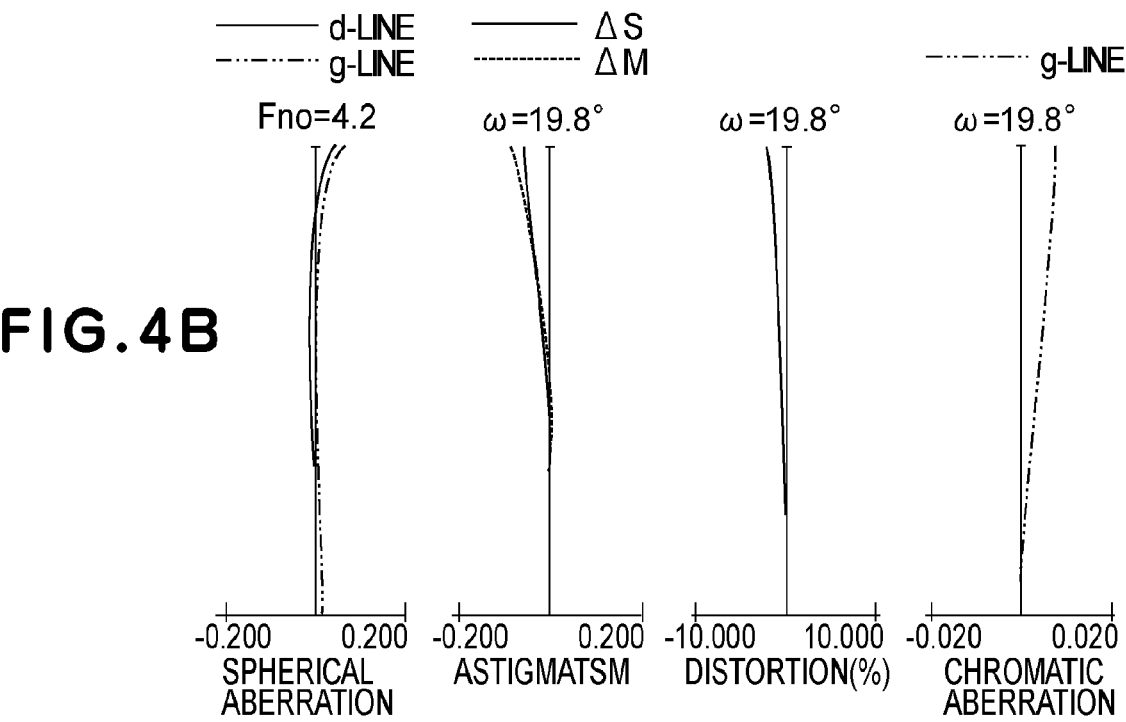
Figure 4C:
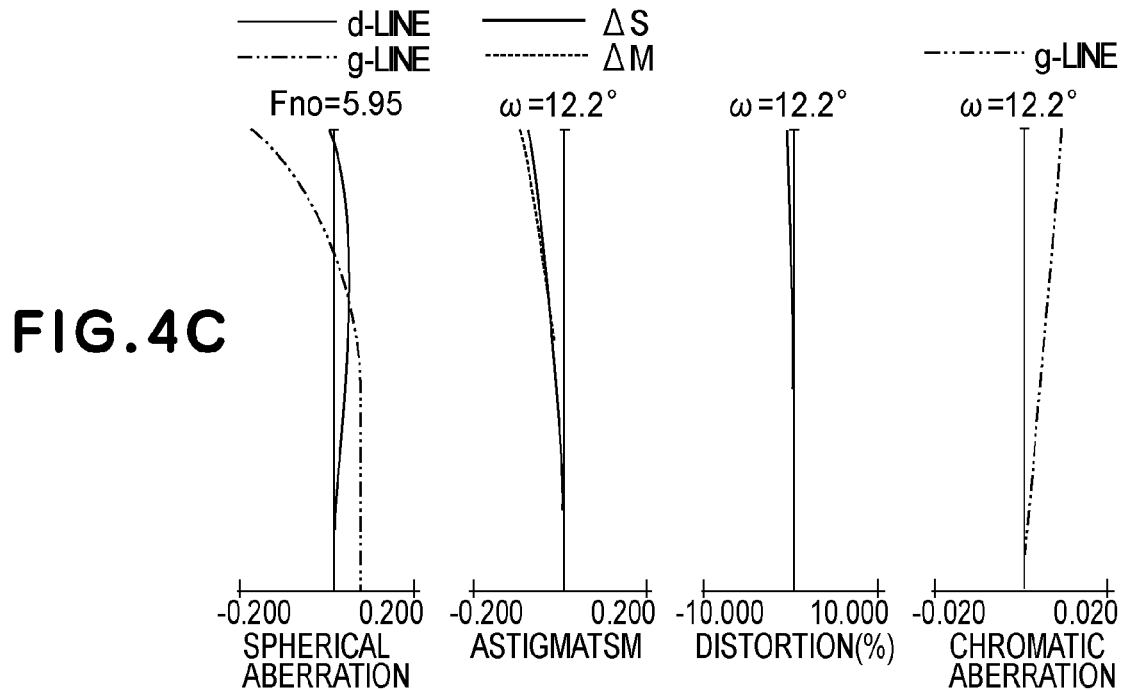

FIG. 3 is a lens sectional view at the wide-angle end (short focal-length end) according to a second embodiment of the present invention. FIG. 4A, FIG. 4B and FIG. 4C are aberration diagrams in the second embodiment of the present invention, at the wide-angle end, an intermediate zoom position and the telephoto end (long focal-length end), respectively.

The second embodiment provides a zoom lens having a zoom ratio of 4.18 and an aperture ratio of around 2.6 to 5.9.

Figure 5:
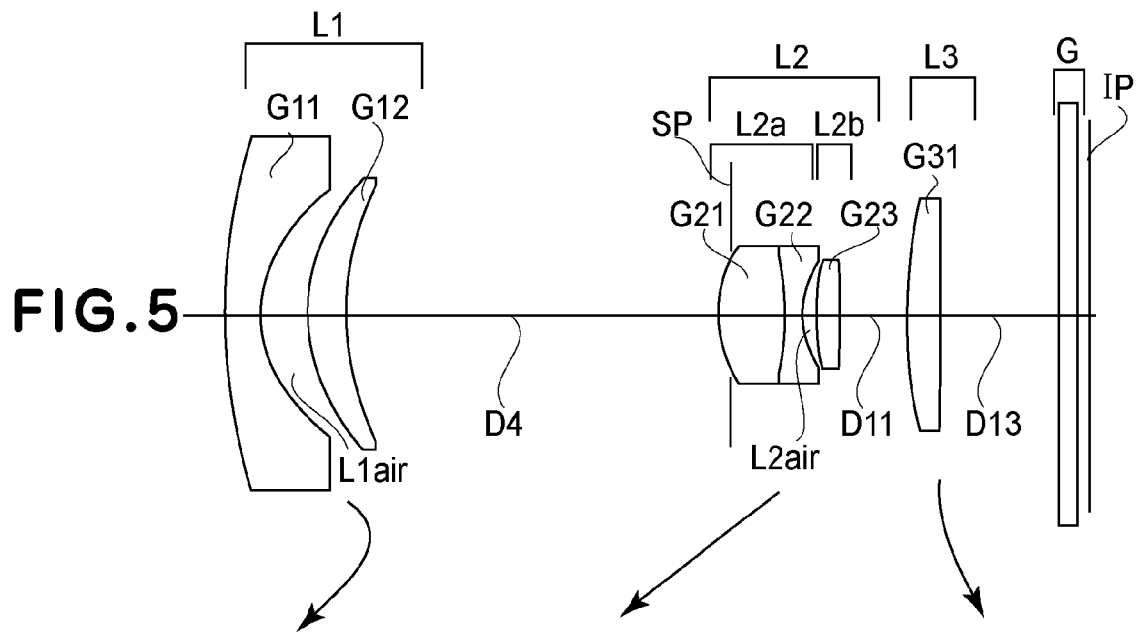
FIG. 5 is a sectional view of a zoom lens at the wide-angle end, according to a third embodiment of the present invention.
Figure 6A:
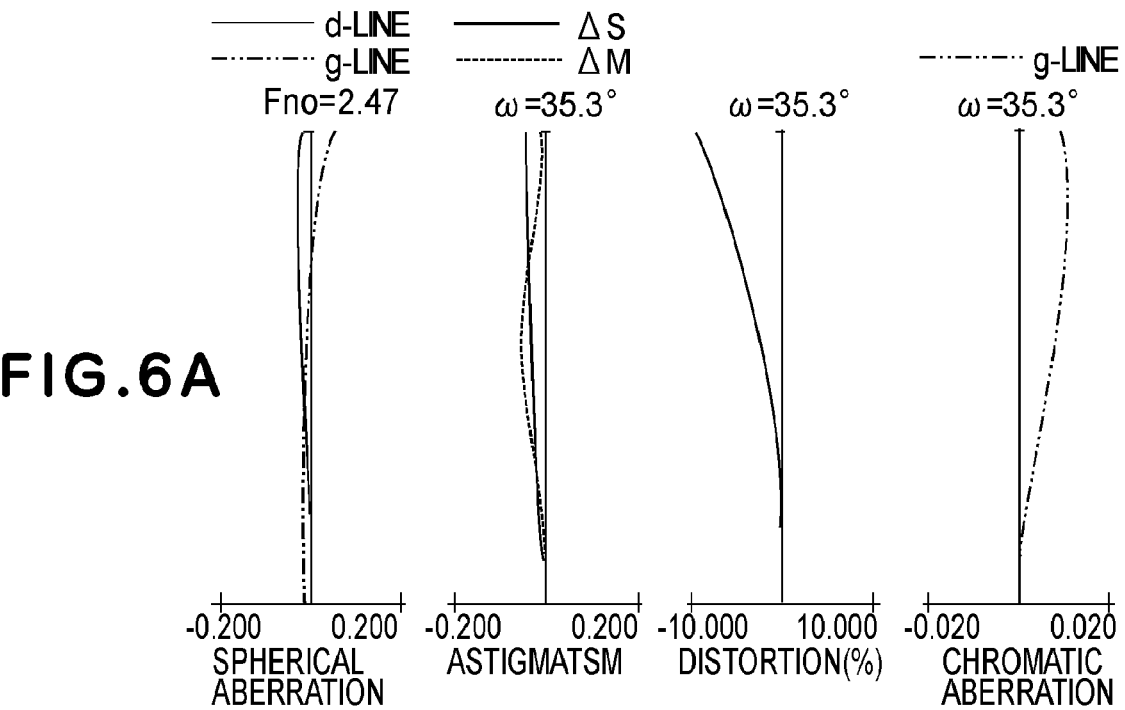
Figure 6B:
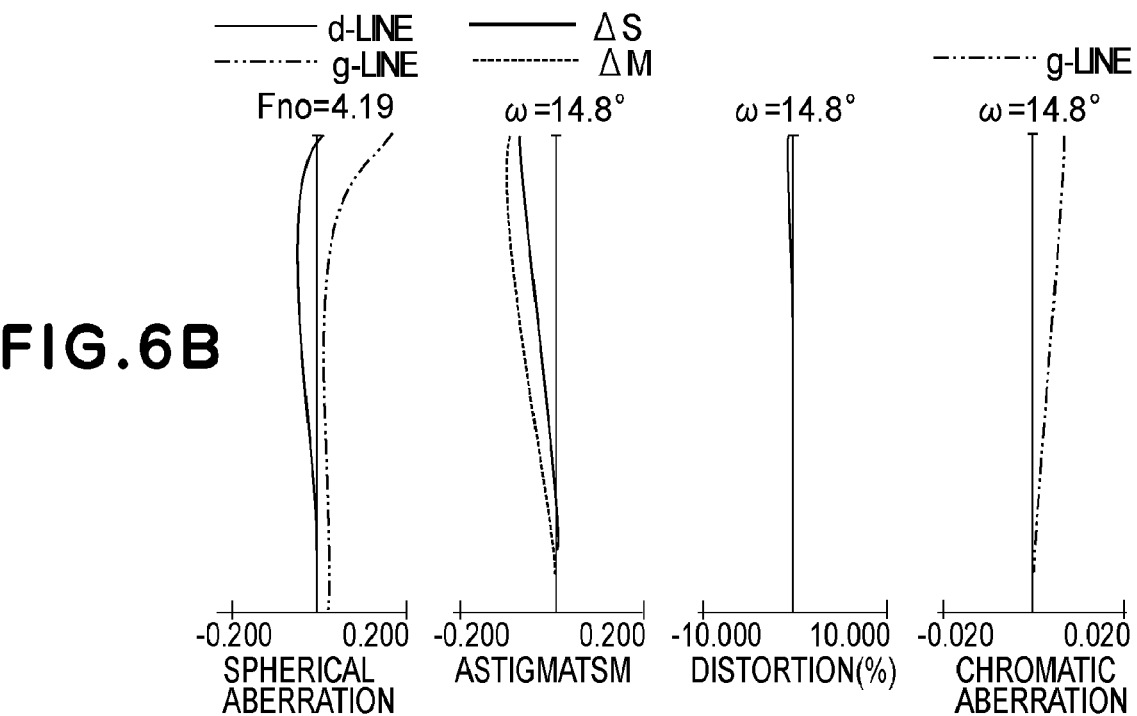

FIG. 5 is a lens sectional view at the wide-angle end (short focal-length end) according to a third embodiment of the present invention. FIG. 6A, FIG. 6B and FIG. 6C are aberration diagrams in the third embodiment of the present invention, at the wide-angle end, an intermediate zoom position and the telephoto end (long focal-length end), respectively. The third embodiment provides a zoom lens having a zoom ratio of 4.68 and an aperture ratio of around 2.5 to 5.9.

Figure 8A:
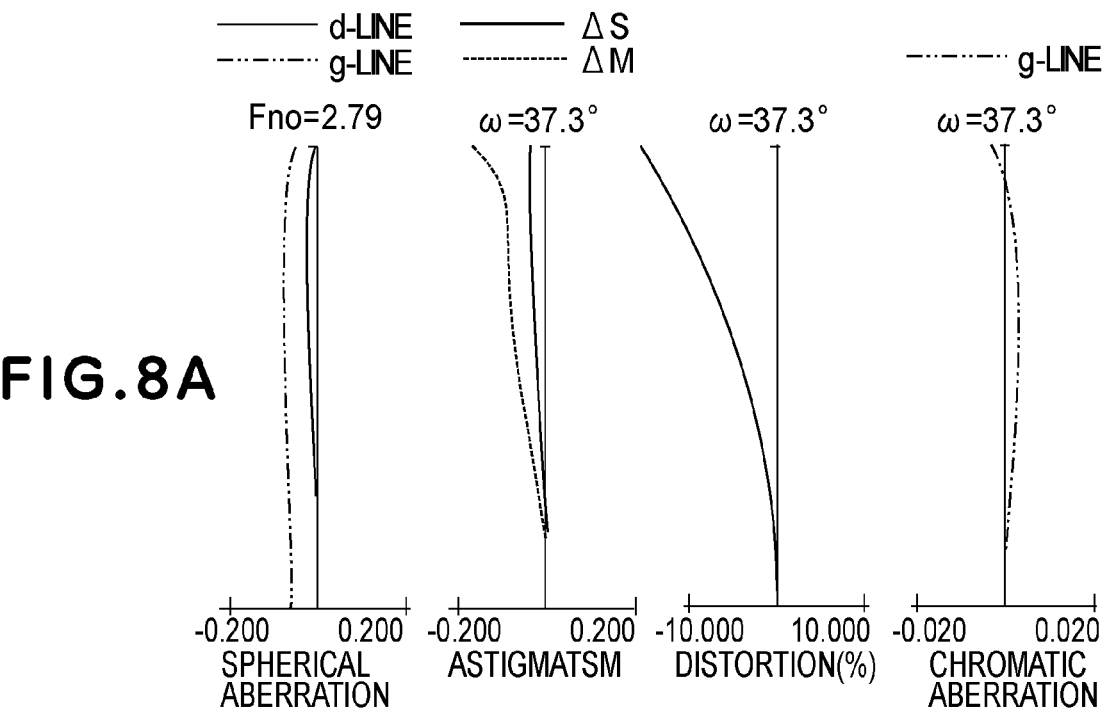
FIG. 8A, FIG. 8B and FIG. 8C are aberration diagrams of the zoom lens of the fourth embodiment.
Figure 8B:
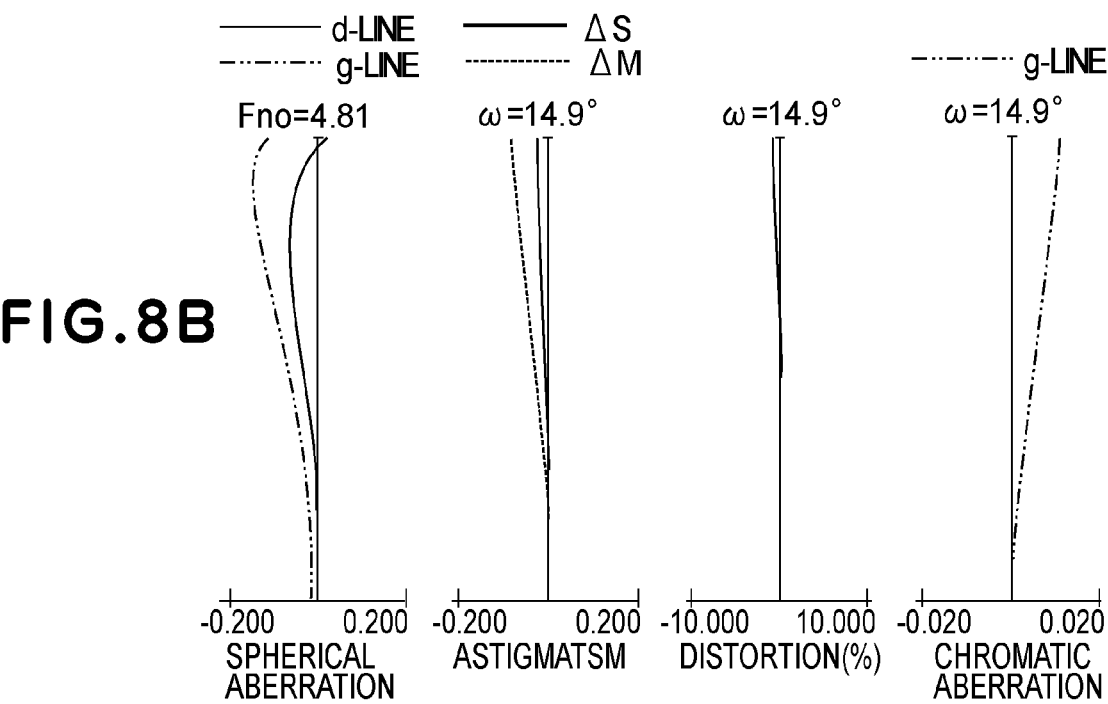
Figure 8C:
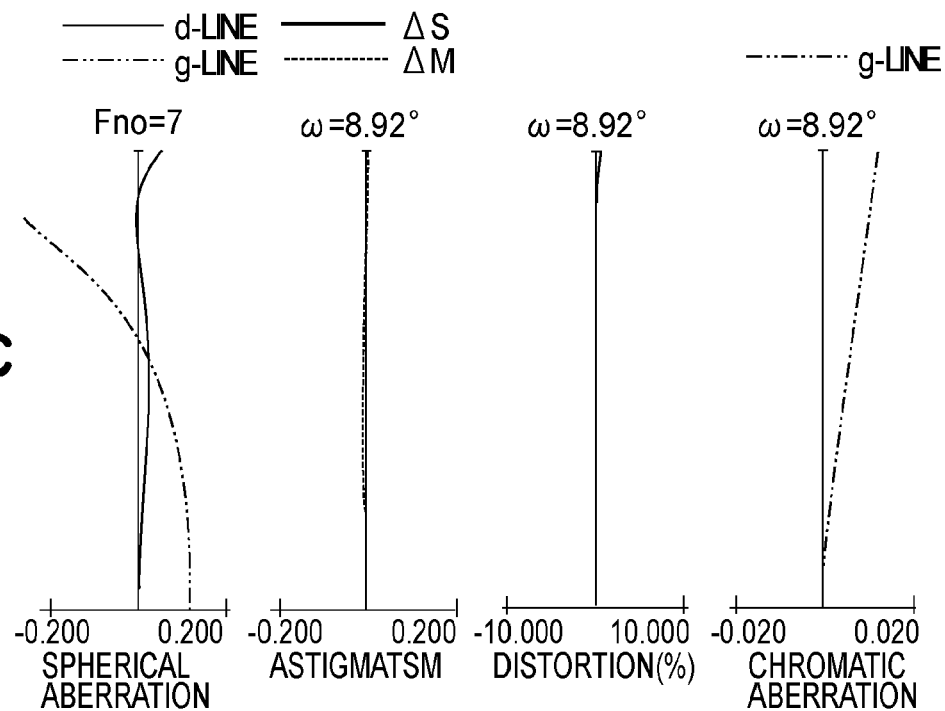

FIG. 7 is a lens sectional view at the wide-angle end (short focal-length end) according to a fourth embodiment of the present invention. FIG. 8A, FIG. 8B and FIG. 8C are aberration diagrams in the fourth embodiment of the present invention, at the wide-angle end, an intermediate zoom position and the telephoto end (long focal-length end), respectively. The fourth embodiment provides a zoom lens having a zoom ratio of 4.85 and an aperture ratio of around 2.8 to 7.0.

Figure 9:
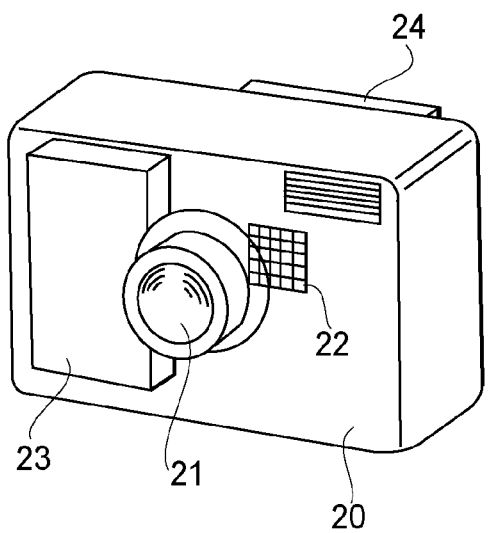
FIG. 9 is a schematic diagram of a main portion of an image pickup apparatus according to the present invention.

FIG. 9 is a schematic diagram of a main portion of a digital still camera having a zoom lens according to the present invention.

The zoom lenses of these embodiments are a photographic lens system usable in an image pickup apparatus. In the lens sectional views, the left-hand side corresponds to the object side (front) and the right-hand side corresponds to the image side (rear).

It should be noted that, when the zoom lens of these embodiments is used in an optical instrument such as a projector, the left-hand side corresponds to a screen while the right-hand side corresponds to an image to be projected.

In the lens sectional views, denoted at L1 is a first lens group having a negative refracting power (optical power is equal to the reciprocal of the focal length). Denoted at L2 is a second lens group having a positive refracting power, and denoted at L3 is a third lens group having a positive refracting power.

Denoted at L2a is a sub lens group (2a) of the second lens group, having a positive refracting power. Denoted at L2b is another sub lens group (2b) of the second lens group, having a positive refracting power.

Denoted at L1air and L2air are air lenses of negative refracting power. Denoted at SP is an F-number determining member having a function of an aperture stop, which determines (limits) the open F number (Fno) light beam (hereinafter, this will be referred to also as "aperture stop").

Denoted at G is an optics block corresponding to an optical filter, face plate, crystal low-pass filter or infrared cut-off filter, for example. Denoted at IP is an image plane. When the zoom lens is used as a photographic optical system of a video camera or a digital still camera, the imaging surface of the solid-state image sensing device (photoelectric conversion element) such as a CCD sensor or CMOS sensor is put on this image plane.

Among the aberration diagrams, the spherical aberration diagram illustrates d-line and g-line. Denoted at Fno is the F number. In the astigmatism diagrams, denoted at ΔM and ΔS are the meridional image surface and the sagittal image surface, respectively. The chromatic aberration of magnification is depicted by g-line. Denoted at ω is the half field angle.

Here, it should be noted that in the following embodiments the wide-angle end and the telephoto end refer to the zoom positions when the power-varying lens group (second lens group L2) is located at the opposite ends of the mechanically movable range, respectively, along the optical axis.

In the lens sectional views, arrows illustrate the movement locus of the lens groups during the zooming operation from the wide-angle end to the telephoto end.

In the zoom lenses of the above-described embodiments of the present invention, during the zooming operation from the wide-angle end to the zoom position of the telephoto end, the first lens group L1 approximately reciprocates while partly drawing a locus being convexed toward the image side, thereby to correct a change of the image surface resulting from the power variation. The second lens group L2 monotonously moves to the object side to perform the main power variation. The third lens group L3 moves to the image side.

Here, during the zooming operation from the wide-angle end to the telephoto end, these lens groups are moved so that the spacing between the first lens group L1 and the second lens group L2 is kept small while the spacing between the second lens group L2 and the third lens group L3 is enlarged.

By moving the third lens group to the object side, the focusing from the infinity object to a short-distance object is carried out.

The F number determining member SP is disposed, with respect to the optical axis direction, between the object side vertex of a lens G21 of the second lens group L2, which is placed closest to the object side, and the point of intersection of the object-side surface of the lens G21 with the outer periphery (lens edge).

In this manner, the F number determining member SP is placed inside the second lens group L2 and, by moving it together with the second lens group L2 during the zooming operation, the distance between the first lens group L1 and the entrance pupil at the wide-angle lens side is reduced.

By disposing the aperture stop SP in the manner described above, the spacing between the first lens group L1 and second lens group L2 at the telephoto end can be shortened. Therefore, a sufficient movement amount of the second lens group L2 to the object side, for the zooming, can be secured. As a result of this, the increase of the lens overall length at the telephoto end can be avoided while attaining increased zooming power.

Next, features of the lens structures of the zoom lenses in the above-described embodiments will be described.

Generally, when a zoom lens which is small in the whole system size and which has a wide field angle is going to be made and if the negative-lead type in which a lens group having a negative refracting power is leading is chosen, the rear principal point position can be shifted toward the image side such that a long back focus can be attained relatively easily.

Then, in order to realize a zoom lens having good telecentric characteristic at the image side, the lens group closest to the image pickup device (image plane) should comprise a lens group having a positive refracting power, so that it plays the role of a field lens.

The zoom lens of each of the above-described embodiments comprise at least three lens groups including, in an order from the object side to the image side, a first lens group L1 having a negative refracting power, a second lens group L2 having a positive refracting power and a third lens group L3 having a positive refracting power.

In order to realize good optical performance in the whole zoom range while securing a wide field angle, smallness in the whole system size and high zoom ratio, the following three structural features should be taken into account.

First, the refracting power of the first lens group should be set appropriately.

Generally, if the field angle of the zoom lens is widened, it causes an increase of the diameter of the front lens closest to the subject to be photographed.

Since the front lens diameter is determined by the height of the abaxial light ray passing through the first lens group, by appropriately setting the refracting power of the first lens group so that the abaxial light ray is refracted sufficiently, a smaller size can be accomplished while a wider angle can be achieved.

Second, the lateral magnification of second lens group L2 at the wide-angle end and the telephoto end should be set appropriately.

Generally, in the three-group zoom lens in which the position of the third lens group L3 on the light path is substantially unchanged between the wide-angle end and the telephoto end, for reduction in size of the overall length it is desirable that the lens overall lengths at the wide-angle end and the telephoto end are made equal to each other. Solving this condition paraxially, it is seen that the lateral magnification of the second lens group L2 at the wide-angle end and the telephoto end should be set as follows.

$$\beta 2w = 1/\sqrt{Z}$$

$$\beta 2T = \sqrt{Z}$$

$$Z = fT/fW$$

Here, during the zooming operation from the wide-angle end to the telephoto end, the first lens group moves, first of all, from the wide-angle end to an intermediate zoom position (intermediate focal length) of the whole zoom range, and subsequently, it moves up to the telephoto end along a locus convexed to the object side.

Here, if the aperture stop SP is disposed close to the second lens group and the lateral magnification of the second lens group is set as described above, the spacing between the first lens group and the second lens group becomes too wide such that the front lens diameter will be enlarged by the field-angle widening.

If under such situation the reduction of the front lens diameter should be made insistently, the refracting power of the first lens group has to be strengthened excessively. Therefore, the Petzval sum increases to the negative side and the field curvature is intensified.

In order to balance the field-angle widening and the size reduction, at the wide-angle end the spacing between the first lens group and the aperture stop had better be made closer.

In order to realize this, the lateral magnification $\beta 2w$ of the second lens group at the wide-angle end had better be set to a value which is larger than $1/\sqrt{Z}$.

Namely, for the balance between the field-angle widening and the size reduction, the lateral magnification of the second lens group at the wide-angle end had better satisfy the following condition.

$$\beta 2w = \beta 2w/(1/\sqrt{Z}) > 1$$

Furthermore, where the second lens group is a major power-varying lens group as in the above-described embodiments and the power variation allotment of the third lens group is small, the condition is as follows.

$$Z \approx \beta 2T/\beta 2W$$

Third, the refracting power of the second lens group should be set appropriately.

By suitably setting the refracting power of the second lens group, a high zoom ratio can be achieved without enlarging the movement amount of the second lens group during the zooming.

For the reasons described above, the following conditional expressions (1) to (3) are satisfied at the same time in the above-described embodiments and, by this, a zoom lens of small in the whole system size and having a wide field angle and a high zoom ratio is realized.

More specifically, the focal lengths of the whole system at the wide-angle end and the telephoto end are denoted by fw and fT, respectively. Also, the focal lengths of the first, second and third lens groups are denoted by f1, f2 and f3, respectively.

The lateral magnifications of the second lens group at the wide-angle end and the telephoto end are denoted by $\beta 2w$ and $\beta 2T$, respectively.

Here, the following conditional expressions are satisfied.

$$0.00 < |f1/f3| < 0.45 \tag{1}$$

$$1.0 < |\beta 2w|/(1/\sqrt{(\beta 2T/\beta 2w)}) < 1.5 \tag{2}$$

$$0.00 < f2/\sqrt{(fw \times fT)} \leq 1.05 \tag{3}$$

Conditional expression (1) specifies the refracting power of the first lens group L1.

If the focal length of the first lens group L1 becomes too long beyond the upper limit of conditional expression (1), that is, if the refracting power of the first lens group L1 becomes too weak, then it becomes difficult to make small the front lens diameter (the effective diameter of the first lens group L1).

If the focal length of the first lens group L1 becomes too small beyond the lower limit of conditional expression (1), that is, if the refracting power of the first lens group L1 becomes too strong, the Petzval sum increases to the negative side and the field curvature, particularly, the field curvature at the wide-angle end increases undesirably.

Conditional expression (2) specifies the lateral magnification of second lens group L2 with the zooming. If conditional expression (2) becomes equal to 1, it means a case where the first lens group L1 completely reciprocates with the zooming operation.

If the upper limit of conditional expression (2) is exceeded, although the spacing between first lens group L1 and the second lens group L2 decreases at the wide-angle end, the movement amount of the first lens group L1 has to be increased in order to obtain a desired power variation ratio. As a result, the collapsible tube length increases undesirably.

If the lower limit of conditional expression (2) is exceeded, the spacing between the first lens group L1 and the second lens group L2 becomes too large at the wide-angle end, causing an undesirable increase of the incidence height of the paraxial light ray passing through the front lens.

Here, in order to reduce the front lens diameter, the refracting power of the first lens group L1 has to be strengthened excessively. As a result of this, the Petzval sum increases to the negative side and the field curvature is undesirably intensified.

Conditional expression (3) specifies the refracting power of the second lens group L2.

If the focal length of the second lens group L2 becomes too long beyond the upper limit of conditional expression (3), that is, if the refracting power of the second lens group L2 becomes too small, the movement amount of the second lens group L2 has to be enlarged during the zooming operation in order to obtain a desired zoom ratio.

As a result, the overall optical length in the tube collapse becomes undesirably long.

If the focal length of the second lens group L2 becomes too short beyond the lower limit of conditional expression (3), that is, if the refracting power of the second lens group L2 becomes too large, it becomes difficult to well correct the spherical aberration and coma-aberration in the whole zoom region.

The numerical range of conditional expressions (1) to (3) may be set as follows.

$$0.15 < |f1/f3| < 0.43 \quad (1a)$$

$$1.05 < |\beta 2w|/(1/\sqrt{(\beta 2T/\beta 2w)}) < 1.25$$

$$0.80 < f2/\sqrt{(fw \times fT)} \leq 1.05$$

By specifying the constituent factors as described above, a wide field-angle zoom lens being small in size of the whole system and having good optical performance in the whole zoom range is obtained.

In the above-described embodiments, one or more of the following conditions should be satisfied.

The first lens group L1 includes at least one positive lens, and the refractive index of the material of that positive lens is denoted by nd.

An air lens is defined in the second lens group L2. The curvature radius of the object side surface of the air lens is denoted by R1air, and the curvature radius of the image side surface is denoted by R2air.

If plural air lenses are defined, one having a strongest refracting power may be chosen.

The first lens group L1 comprises two lenses, and the curvature radius of the image side surface of a lens of the first lens group L1 which lens is disposed at the object side is denoted by G1R2. Furthermore, the curvature radius of the object side surface of a lens of the first lens group L1 which lens is disposed at the image side is denoted by G2R1.

The focal length of the lens of the first lens group L1 which is disposed at the image side is denoted by f_G2.

Among the lenses constituting the second lens group L2, the refractive index of the material of a lens which is disposed closest to the object side is denoted by N2.

Here, one or more of the following conditions should be satisfied.

$$3.5 < \beta 2T/\beta 2w < 7.0 \quad (4)$$

$$nd > 1.93 \quad (5)$$

$$-10 < (R1air + R2air)/(R1air - R2air) < -1 \quad (6)$$

$$-10.0 < (G1R2 + G2R1)/(G1R2 - G2R1) < -3.3 \quad (7)$$

$$5.1 < f3/fw < 11.0 \quad (8)$$

$$1.5 < f\_G2/f1 < 2.5 \quad (9)$$

$$N2 > 1.75 \quad (10)$$

Conditional expression (4) specifies the change of the lateral magnification with the zooming of the second lens group L2.

If the change of the lateral magnification of the second lens group L2 with the zooming becomes excessive beyond the upper limit of conditional expression (4), the movement amount of the second lens group L2 with the zooming increases, causing undesirable enlargement of the tube collapsing length.

If the change of the lateral magnification of the second lens group L2 with the zooming becomes lower than the lower limit of conditional expression (4), it means that the change of the lateral magnification of the second lens group L2 is too small and it becomes difficult to obtain a desired zoom ratio.

Conditional expression (5) specifies the refractive index of the material of the positive lens of the first lens group L1.

If the lower limit of the conditional expression (5) is exceeded, the radius of curvature of the lens surface of the positive lens becomes too small, causing an increase of the Petzval sum toward the positive side and undesirable intensification of the field curvature.

Conditional expression (6) specifies the shape of the air lens (if there are plural air lenses, one air lens having a strongest refracting power) of the second lens group L2.

The shape of this air lens is a positive meniscus shape having a convex surface facing to the object side. Both sides of the air lens are sandwiched by mediums having a refractive index of 1 or more, and a refractive index difference is produced there. Thus, this air lens can be considered as a lens having a refracting function as of a negative lens.

When the value of conditional expression (6) takes −1, the air lens has a convexo-plane shape having a convex surface facing to the object side.

The curvature of both of the surfaces at the object side and the image side increases as the value of conditional expression (6) becomes smaller than −1, and the meniscus degree is strengthened.

Thus, if the lower limit of conditional expression (6) is exceeded, the curvature of the object side surface and the image side surface of the air lens becomes stronger, and the meniscus degree of the shape of the air lens is strengthened.

As a result of this, the force or power for flipping axial light rays and abaxial light rays upwards becomes excessive, and correction of the spherical aberration becomes insufficient throughout the whole zoom region. Furthermore, flare increases due to upper linear light (light rays having bright F number).

If the upper limit of conditional expression (6) is exceeded, the negative refracting power that the air lens bears is weakened.

As a result of this, particularly for correction of longitudinal chromatic aberration at the telephoto end, a lens with a negative refracting power has to be added, causing an undesirable increase of the number of the structural lenses.

Conditional expression (7) specifies the shape of an air lens defined in the first lens group L1.

If the lower limit of conditional expression (7) is exceeded, the meniscus degree of the shape of the air lens is strengthened.

Since the first lens G11 has a meniscus shape having a convex surface facing to the object side, if the curvature of the image side surface becomes large, the first lens G11 and the second lens G12 will interfere with each other at their marginal portions. In order to avoid this interference, the axial spacing between the first lens G11 and the second lens G12 has to be widened.

As a result of this, the total thicknesses of the first lens group L1 increases and also the front lens diameter becomes undesirably large.

If the upper limit of conditional expression (7) is exceeded, the negative refracting power that the air lens bears is weakened, and it becomes difficult to well correct the distortion at the wide-angle end.

Conditional expression (8) specifies the refracting power of the third lens group L3.

If the refracting power of the third lens group L3 becomes too small beyond the upper limit of conditional expression (8), the telecentric characteristic at the image side is worsened.

If the refracting power of the third lens group L3 is too strong beyond the lower limit of conditional expression (8), the focus change (focus sensitivity) as the focusing is done by the third lens group L3 becomes undesirably large.

Here, the focus sensitivity refers to the ratio of change of the image position to the unit change of the third lens group L3 in the optical axis direction.

Conditional expression (9) specifies the refracting power of the positive lens G12 of the first lens group L1.

If the lower limit of conditional expression (9) is exceeded, the refracting power of the positive lens G12 occupying in the first lens group L1 becomes excessive. Thus, it becomes difficult to constitute the first lens group L1 with one positive lens.

If the upper limit of the conditional expression (9) is exceeded, the refracting power of the positive lens G12 occupying in the first lens group L1 becomes too small. Thus, correction of the chromatic aberration of magnification becomes undesirably insufficient at the wide-angle end.

Conditional expression (10) specifies the refractive index of the material of the positive lens G21 of the second lens group L2 which lens is closest to object side.

The Second lens group L2 is a lens group which is disposed just after the stop SP, and it is very important to correct mainly the spherical aberration and the coma-aberration.

Furthermore, the refracting power thereof is strengthened up to the limit where satisfactory optical performance is obtained to assure a high zoom ratio.

If the lower limit of conditional expression (10) is exceeded, the curvature of the lens surface of the positive lens G21 of the second lens group L2 which lens is closest to the object side, has to be enlarged. This undesirably results in insufficient correction of the spherical aberration.

In addition, more desirably, the numerical ranges of conditional expressions (4) to (10) had better be set as follows.

$$3.5 < \beta 2T/\beta 2w < 5.0 \quad (4a)$$

$$nd > 1.94 \quad (5a)$$

$$-5.0 < (R1air + R2air)/(R1air - R2air) < -1.5 \quad (6a)$$

$$-5.0 < (G1R2 + G2R1)/(G1R2 - G2R1) < -3.3 \quad (7a)$$

$$5.5 < f3/fw < 10.7 \quad (8a)$$

$$1.6 < f\_G2/f1 < 2.4 \quad (9a)$$

$$N2 > 1.76 \quad (10a)$$

The object side surface and the image side surface of the first lens group L1 comprise a negative lens having an aspherical shape. This easily ensures satisfactory optical performance throughout the whole zoom range.

Next, the lens structure according to each the above-described embodiments will be explained.

In the above-described embodiments, the first lens group L1 of negative refracting power comprises two lenses, that is, in an order from the object side to the image side, a negative lens G11 of meniscus shape having a convex surface facing to the object side, and a positive lens G12 of meniscus shape having a convex surface facing to the object side. An air lens L1air is defined between the negative lens G11 and the positive lens G12.

Since in the first lens group L1, the amount of refraction of the abaxial light rays at the wide-angle end is large, abaxial aberrations, particularly, astigmatism and distortion are easy to occur.

In consideration of this, in the above-described embodiment, the first lens group comprises a negative lens G11 and a positive lens G12 as mentioned hereinbefore, thereby to avoid the increase of the diameter of the lens closest to the object side.

The first lens group L1 is provided by structural lenses of a number of two. A high refractive index glass material is used for both of them, to ensure that the refracting power of each lens surface is held small to suppress the field curvature.

Additionally, a low dispersion glass material is used for the negative lens G11, while a high dispersion glass material is used for the positive lens G12. By doing so, the chromatic aberration of magnification is well corrected at the telephoto end and the longitudinal chromatic aberration is well corrected at the wide-angle end.

Furthermore, in the negative lens G11 of the meniscus shape, both of the object side surface and the image side surface comprise an aspherical shape in which negative refracting power is decreasing from the lens center to the lens periphery. With this arrangement, both the astigmatism and distortion can be corrected in a good balance and, additionally, the first lens group L1 can be constituted by a small number of lenses which is two lenses. Thus, the size of the whole system can be made small.

The second lens group L2 has a sub lens group (2a) L2a which is a cemented lens comprising, in an order from the object side to the image side, a positive lens G21 having a convex surface facing to the object side and a negative lens G22 having a concave surface facing to the image plane side (being concaved at the image plane side). Furthermore, the second lens group has a sub lens group (2b) L2b which is a cemented lens comprising a negative lens G23 of meniscus shape having a convex surface facing to the object side and a positive lens G24 with biconvex lens surfaces.

Alternatively, the second lens group L2 comprises, in an order from the object side to the image side, a sub lens group (2a) L2a which is a cemented lens comprising a positive lens G21 having a convex surface facing to the object side and a negative lens G22 having a concave surface facing to the image plane side, and also a sub lens group (2b) L2b comprising a positive lens G23.

An air lens L2air of negative refracting power is defined between the negative lens G22 and the negative lens G23.

In the zoom lenses according to the above-described embodiments, the second lens group L2 is constituted by the sub lens group (2a) L2a and the sub lens group (2b) L2b such that the increase of the refracting power of the second lens group L2 due to the field-angle widening can be shared by them and, additionally, the decentration sensitivity can be reduced.

The structure of the sub lens group (2a) L2a is such that the positive lens G21 is disposed at the object side and the shape is designed to reduce the refraction angle of the abaxial light rays emerging from the first lens group L1 and suppress generation of abaxial aberrations.

The positive lens G21 which is disposed closest to the object side is a lens configured so that the height whereat the axial light ray passes therethrough is high. This lens has strong influence on the generation of spherical aberration and coma-aberration.

In consideration of this, in each of the above-described embodiments, the object-side lens surface of the positive lens G21 disposed closest to the object side is formed with an aspherical shape in which the positive refracting power decreases around the lens periphery. By doing so, the spherical aberration and coma-aberration can be well corrected.

Furthermore, the positive lens G21 of the sub lens group (2a) L2a is formed with a lens shape having a convex surface facing to the object side, while the positive lens of sub lens group (2b) L2b is formed with biconvex lens surfaces. With this arrangement, the spherical aberration and astigmatism are well corrected.

Alternatively, for smaller thickness, the sub lens group (2b) L2b may comprise a single positive lens of biconvex shape, such that the second lens group is constituted by a total of three lenses.

The third lens group L3 plays a role as a field lens for securing the telecentric characteristic. For reduced axial lens thickness, it is constituted by one positive lens G31.

The third lens group L3 is a focus lens group, and it moves from the image side to the object side when the focusing is done from an infinity object to a short-distance object.

Upon the focusing, by appropriately setting the position sensitivity, the speed of focusing can be improved easily.

As described hereinbefore, in the embodiments of the present invention, the lens groups are structured in the manner explained above by which the whole lens system can be made compact while maintaining good optical performance.

In addition, by appropriately setting the refracting power of each lens group as well as the movement locus of each lens group during the zooming operation, a zoom lens of good optical performance having a wide field angle and high zoom ratio and a zoom ratio of 3.5× or higher, is accomplished.

Furthermore, by effectively introducing an aspherical surface into the lens group, a zoom lens having good optical performance in which abaxial aberrations, particularly, field curvature at the wide-angle end and spherical aberration as the aperture ratio is made large can be effectively corrected, is accomplished.

Next, numerical examples of the present invention will be explained. In these numerical examples, denoted by i is the sequential order from the object side, and denoted by ri is the radius of curvature of the lens surface. Denoted by di is the lens thickness or air spacing between the (i)th surface and (i+1)th surface. Denoted by ndi and νdi are the refractive index and the Abbe's number with respect to the d-line, respectively. A symbol "*" shows that the surface is an aspherical surface.

Furthermore, the two surfaces closest to the image side are a glass material such as a face plate. References k, A4, A6, A8, A10 are aspherical coefficients. The aspherical shape can be represented by the following equation, when displacement in the optical axis direction at the height h from the optical axis is taken as x with reference to the surface vertex.

$$x = (h^2/R)/[1+\{1-(1+k)(h/R)^2\}^{1/2}] + A4 \cdot h^4 + A6 \cdot h^6 + A8 \cdot h^8 + A10 \cdot h^{10}$$

where R is the paraxial curvature radius.

Table 1 shows the relationship among the aforementioned conditional expressions and the numerical examples.

In the numerical examples, d5 takes a negative value. This is because it is counted in an order from the object side, that is, in the sequence of the F number determining member and twenty-first lens G21 of the second lens group L2.

As a specific structure, it means that the F number determining member (aperture stop) SP is positioned at the image side by an absolute value d5 than the object side vertex of the object side lens surface of the twenty-first lens G21 of the second lens group L2.

Numerical Example 1

Unit: mm
Surface Data

| Surface No. | r | d | nd | νd |
|---|---|---|---|---|
| 1* | 23.471 | 1.50 | 1.88300 | 40.8 |
| 2* | 4.984 | 2.47 | | |
| 3 | 8.769 | 1.45 | 1.94595 | 18.0 |
| 4 | 13.310 | (variable) | | |
| 5 (stop) | ∞ | −0.53 | | |
| 6* | 4.815 | 2.10 | 1.80610 | 40.9 |
| 7 | 90.281 | 0.69 | 1.69895 | 30.1 |
| 8 | 3.952 | 0.48 | | |
| 9 | 8.763 | 0.50 | 1.76182 | 26.5 |
| 10 | 4.383 | 1.91 | 1.63854 | 55.4 |
| 11 | −19.620 | (variable) | | |
| 12 | 19.617 | 1.40 | 1.63854 | 55.4 |
| 13 | −426.792 | (variable) | | |
| 14 | ∞ | 0.80 | 1.51633 | 64.1 |
| 15 | ∞ | 0.41 | | |

Aspherical Data

First Surface:

K = −5.04724e+001, A4 = −1.25581e−005, A6 = 6.08097e−006,
A8 = −1.10862e−007, A10 = 6.87817e−010

Second Surface:

K = −2.29471e+000, A4 = 1.11256e−003, A6 = 3.18530e−006,
A8 = 1.70481e−007, A10 = −2.46347e−009

Sixth Surface:

K = −4.715266−001, A4 = 7.82315e−005, A6 = 6.67227e−006

Various Data
Zoom ratio: 3.79

| | Wide-Angle | Intermediate | Telephoto |
|---|---|---|---|
| Focal Length | 5.15 | 12.22 | 19.50 |
| F No. | 2.85 | 4.38 | 5.95 |
| Field Angle | 35.56 | 17.59 | 11.24 |
| Image Height | 3.68 | 3.88 | 3.88 |
| Lens Whole Length | 35.68 | 33.03 | 37.92 |
| BF | 0.41 | 0.41 | 0.41 |
| d4 | 14.12 | 3.72 | 0.86 |
| d11 | 4.10 | 12.25 | 20.24 |
| d13 | 4.27 | 3.87 | 3.63 |

Zoom Lens Group Data

| Group | Starting Surface | Focal Length |
|---|---|---|
| 1 | 1 | −11.63 |
| 2 | 5 | 10.13 |
| 3 | 12 | 29.41 |
| 4 | 14 | ∞ |

Numerical Example 2

Unit: mm
Surface Data

| Surface No. | r | d | nd | vd |
|---|---|---|---|---|
| 1* | 28.181 | 1.50 | 1.88300 | 40.8 |
| 2* | 4.410 | 2.16 | | |
| 3 | 7.925 | 1.70 | 1.94595 | 18.0 |
| 4 | 12.422 | (variable) | | |
| 5 (stop) | ∞ | −0.53 | | |
| 6* | 4.542 | 2.06 | 1.80610 | 40.9 |
| 7 | 99.999 | 0.60 | 1.69895 | 30.1 |
| 8 | 4.065 | 0.60 | | |
| 9 | 14.868 | 0.60 | 1.76182 | 26.5 |
| 10 | 4.879 | 2.00 | 1.63854 | 55.4 |
| 11 | −9.583 | (variable) | | |
| 12 | 35.415 | 1.40 | 1.63854 | 55.4 |
| 13 | −41.083 | (variable) | | |
| 14 | ∞ | 0.80 | 1.51633 | 64.1 |
| 15 | ∞ | 0.40 | | |

Aspherical Data

First Surface:

$K = -1.71894e+000, A4 = -1.33587e-004, A6 = 5.27190e-006, A8 = -8.73981e-008, A10 = 1.83065e-010$

Second Surface:

$K = -1.78837e+000, A4 = 1.54244e-003, A6 = -2.95670e-005, A8 = 2.38979e-006, A10 = -6.77117e-008$

Sixth Surface:

$K = -5.09847e-001, A4 = -1.02684e-004, A6 = 2.12167e-006$

Various Data
Zoom ratio: 4.18

| | Wide-Angle | Intermediate | Telephoto |
|---|---|---|---|
| Focal Length | 4.30 | 10.74 | 18.00 |
| F No. | 2.63 | 4.20 | 5.95 |
| Field Angle | 40.54 | 19.84 | 12.15 |
| Image Height | 3.68 | 3.88 | 3.88 |
| Lens Whole Length | 32.89 | 31.93 | 37.51 |
| BF | 0.40 | 0.40 | 0.40 |
| d4 | 12.34 | 3.32 | 0.83 |
| d11 | 2.16 | 11.62 | 20.89 |
| d13 | 5.10 | 3.70 | 2.50 |

Zoom Lens Group Data

| Group | Starting Surface | Focal Length |
|---|---|---|
| 1 | 1 | −9.36 |
| 2 | 5 | 9.20 |
| 3 | 12 | 30.00 |
| 4 | 14 | ∞ |

Numerical Example 3

Unit: mm
Surface Data

| Surface No. | r | d | nd | vd |
|---|---|---|---|---|
| 1* | 17.305 | 1.50 | 1.88300 | 40.8 |
| 2* | 4.855 | 1.97 | | |
| 3 | 7.909 | 1.53 | 1.94595 | 18.0 |
| 4 | 11.307 | (variable) | | |
| 5 (stop) | ∞ | −0.53 | | |
| 6* | 4.830 | 2.82 | 1.77250 | 49.6 |
| 7 | −11.488 | 0.69 | 1.69895 | 30.1 |
| 8 | 3.804 | 0.51 | | |
| 9 | 8.542 | 1.00 | 1.71999 | 50.2 |
| 10 | −102.595 | (variable) | | |
| 11 | 20.353 | 1.40 | 1.63854 | 55.4 |
| 12 | 2090.657 | (variable) | | |
| 13 | ∞ | 0.80 | 1.51633 | 64.1 |
| 14 | ∞ | 0.40 | | |

Aspherical Data

First Surface:

$K = -1.21374e+001, A4 = -1.42675e-004, A6 = 6.04473e-006, A8 = -1.01965e-007, A10 = 6.78506e-010$

Second Surface:

$K = -2.29173e+000, A4 = 1.29709e-003, A6 = -1.26160e-005, A8 = 3.99338e-007, A10 = -3.39269e-009$

Sixth Surface:

$K = -6.00406e-001, A4 = 1.36472e-004, A6 = 5.49321e-006, A8 = -5.00000e-008$

Various Data
Zoom ratio: 4.68

| | Wide-Angle | Intermediate | Telephoto |
|---|---|---|---|
| Focal Length | 5.21 | 14.67 | 24.36 |
| F No. | 2.47 | 4.19 | 5.95 |
| Field Angle | 35.26 | 14.80 | 9.04 |
| Image Height | 3.68 | 3.88 | 3.88 |
| Lens Whole Length | 35.69 | 32.79 | 39.51 |
| BF | 0.40 | 0.40 | 0.40 |
| d4 | 15.91 | 3.55 | 0.81 |
| d10 | 2.78 | 12.64 | 22.29 |
| d12 | 4.91 | 4.51 | 4.31 |

Zoom Lens Group Data

| Group | Starting Surface | Focal Length |
|---|---|---|
| 1 | 1 | −12.67 |
| 2 | 5 | 10.02 |
| 3 | 11 | 32.18 |
| 4 | 13 | ∞ |

Numerical Example 4

Unit: mm
Surface Data

| Surface No. | r | d | nd | vd |
|---|---|---|---|---|
| 1* | 71.612 | 1.35 | 1.84862 | 40.0 |
| 2* | 5.028 | 2.00 | | |
| 3 | 8.068 | 1.33 | 1.94595 | 18.0 |
| 4 | 12.040 | (variable) | | |
| 5 (stop) | ∞ | −0.49 | | |
| 6* | 4.025 | 1.87 | 1.80447 | 40.9 |
| 7 | 7.339 | 0.60 | 1.71736 | 29.5 |
| 8 | 3.374 | 0.51 | | |
| 9 | 8.437 | 0.50 | 1.84666 | 23.9 |
| 10 | 4.287 | 2.02 | 1.74100 | 52.6 |
| 11 | −19.762 | (variable) | | |
| 12* | 23.127 | 1.35 | 1.62299 | 58.2 |
| 13 | 89.039 | (variable) | | |
| 14 | ∞ | 0.72 | 1.51633 | 64.1 |
| 15 | ∞ | 0.39 | | |

-continued

Aspherical Data

First Surface:

K = −1.09498e+001, A4 = −1.04678e−004, A6 = 1.12939e−008,
A8 = 7.69630e−008, A10 = −7.10839e−010

Second Surface:

K = −2.74281e+000, A4 = 1.96745e−003, A6 = −5.11685e−005,
A8 = 1.40415e−006, A10 = −1.05844e−009

Sixth Surface:

K = −2.54664e−001, A4 = −2.37845e−004, A6 = 1.45202e−006,
A8 = −6.74053e−007

Twelfth Surface:

K = −1.30561e+001, A4 = 1.02781e−004, A6 = −4.38290e−006,
A8 = 7.72529e−008

Various Data
Zoom ratio: 4.86

|  | Wide-Angle | Intermediate | Telephoto |
|---|---|---|---|
| Focal Length | 4.69 | 13.38 | 22.76 |
| F No. | 2.79 | 4.81 | 7.00 |
| Field Angle | 37.31 | 14.94 | 8.92 |
| Image Height | 3.57 | 3.57 | 3.57 |
| Lens Whole Length | 33.14 | 32.00 | 38.83 |
| BF | 0.39 | 0.39 | 0.39 |
| d4 | 13.29 | 3.05 | 0.76 |
| d11 | 4.03 | 14.64 | 25.25 |
| d13 | 3.67 | 2.17 | 0.67 |

Zoom Lens Group Data

| Group | Starting Surface | Focal Length |
|---|---|---|
| 1 | 1 | −9.50 |
| 2 | 5 | 8.94 |
| 3 | 12 | 49.76 |
| 4 | 14 | ∞ |

TABLE 1

| Conditional Expression | Embodiments | | | |
|---|---|---|---|---|
|  | 1st | 2nd | 3rd | 4th |
| 1 | 0.40 | 0.31 | 0.39 | 0.19 |
| 2 | 1.08 | 1.15 | 1.12 | 1.19 |
| 3 | 1.01 | 1.05 | 0.89 | 0.87 |
| 4 | 3.72 | 3.79 | 4.64 | 4.55 |
| 5 | 1.95 | 1.95 | 1.95 | 1.95 |
| 6 | −2.64 | −1.75 | −2.61 | −2.33 |
| 7 | −3.63 | −3.51 | −4.18 | −4.31 |
| 8 | 5.71 | 6.98 | 6.18 | 10.62 |
| 9 | 1.69 | 2.09 | 1.80 | 2.34 |
| 10 | 1.81 | 1.81 | 1.77 | 1.80 |

Next, referring to FIG. 9, an embodiment of a digital still camera (image pickup apparatus) (optical instrument) which uses a zoom lens of the present invention as a photographic optical system will be explained.

In FIG. 9, denoted at 20 is a camera body, and denoted at 21 is a photographic optical system which comprises a zoom lens of the present invention. Denoted at 22 is a solid-state image sensing device (photoelectric conversion element) such as a CCD sensor or CMOS sensor, which is built in the camera body and which receives a photographic subject image formed by the photographic optical system 21. Denoted at 23 is a memory (for recording information corresponding to the photographic subject image as photoelectrically converted by the image pickup device 22. Denoted at 24 is a finder which comprises a liquid crystal display panel or the like to observe the photographic subject image formed on the solid-state image sensing device 22.

By incorporating a zoom lens of the present invention into an image pickup apparatus such as digital still camera, an image pickup apparatus being small in size and having good optical performance is accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-101395 filed Apr. 9, 2008, for which is hereby incorporated by reference.

What is claimed is:

1. A zoom lens, comprising:
a first lens group of negative refracting power;
a second lens group of positive refracting power; and
a third lens group of positive refracting power,
wherein the first lens group, the second lens group and the third lens group are disposed in the following order from an object side of the zoom lens to an image side of the zoom lens: the first lens group, the second lens group and the third lens group,
wherein the first lens group and the second lens group are configured to move during a zooming operation, and
wherein, when a focal length of a system comprising the first lens group, the second lens group and the third lens group at a wide-angle end is denoted by fw, a focal length of the system at a telephoto end is denoted by fT, a focal length of the first lens group is denoted by f1, a focal length of the second lens group is denoted by f2, a focal length of the third lens group is denoted by f3, a lateral magnification of the second lens group at the wide-angle end is denoted by β2w, and a lateral magnification of the second lens group at the telephoto end is denoted by β2T, the following conditions:

$0.00 < |f1/f3| < 0.45$ $1.0 < |\beta 2w|/(1/\sqrt{(\beta 2T/\beta 2w)}) < 1.5$ $0.00 < f2/\sqrt{(fw \times fT)} \leq 1.05$ are satisfied.

2. The zoom lens according to claim 1, wherein a conditional expression $3.5 < \beta 2T/\beta 2w < 7.0$ is satisfied.

3. The zoom lens according to claim 1, wherein the first lens group includes at least one positive lens, and wherein, when a refractive index of a material of the positive lens is denoted by nd, a conditional expression $nd > 1.93$ is satisfied.

4. The zoom lens according to claim 1, wherein an air lens is defined in the second lens group, and wherein, when a curvature radius of an object side surface of the air lens is denoted by R1air and a curvature radius of an image side surface of the air lens is denoted by R2air, a conditional expression $-10 < (R1air + R2air)/(R1air - R2air) < -1$ is satisfied.

5. The zoom lens according to claim 1, wherein said first lens group comprises two lenses, and wherein, when a curvature radius of an image side surface of a lens of the first lens group which lens is disposed at the object side is denoted by G1R2 and a curvature radius of an object side surface of a lens of the first lens group which lens is disposed at the image side is denoted by G2R1, a conditional expression $$-10.0 < (G1R2+G2R1)/(G1R2-G2R1) < -3.3$$

is satisfied.

6. The zoom lens according to claim 1, wherein, when a focal length of the third lens group is denoted by f3, a conditional expression $$5.1 < f3/fw < 11.0$$

is satisfied.

7. The zoom lens according to claim 1, wherein the first lens group comprises two lenses, and wherein, when a focal length of a lens of the first lens group which lens is disposed at the image side is denoted by f_G2 and a focal length of the first lens group is denoted by f1, a conditional expression $$1.5 < f\_G2/f1 < 2.5$$

is satisfied.

8. The zoom lens according to claim 1, wherein, when, among lenses comprising the second lens group, a refractive index of a material of a lens disposed closest to the object side is denoted by N2, a conditional expression $$N2 > 1.75$$

is satisfied.

9. The zoom lens according to claim 1, wherein, during the zooming operation from the wide-angle end to the telephoto end, the first lens group moves while partly drawing a locus being convexed toward the image side, the second lens group moves monotonously toward the object side, and the third lens group moves toward the image side.

10. The zoom lens according to claim 1, wherein the first lens group includes a negative lens having an object side surface and an image side surface which are of aspherical shape.

11. The zoom lens according to claim 1, wherein the third lens group moves to the object side to perform focusing from an infinity object to a short-distance object.

12. The zoom lens according to claim 1, wherein the first lens group includes, in an order from the object side to the image side, a negative lens of meniscus shape having a convex surface at the object side, and a positive lens of meniscus shape having a convex surface at the object side.

13. The zoom lens according to claim 1, wherein the second lens group includes, in an order from the object side to the image side, a cemented lens comprising a positive lens having a convex surface at the object side and a negative lens having a concave surface at the image side, and another cemented lens comprising a negative lens having a convex surface at the object side and a positive lens having a convex surface at the object side.

14. The zoom lens according to claim 1, wherein the second lens group includes, in an order from the object side to the image side, a cemented lens comprising a positive lens having a convex surface at the object side and a negative lens having a concave surface at the image side, and a positive lens.

15. The zoom lens according to claim 1, wherein the third lens group comprises a single positive lens.

16. An image pickup apparatus, comprising:
a zoom lens as recited in claim 1; and
a solid-state image sensing device configured to receive an image formed by the zoom lens.

* * * * *